US011951956B2

United States Patent
Ganzel

(10) Patent No.: US 11,951,956 B2
(45) Date of Patent: Apr. 9, 2024

(54) SINGLE CHAMBER POWER TRANSMISSION UNIT AND BRAKE SYSTEMS USING SAME

(71) Applicant: ZF Active Safety US Inc., Livonia, MI (US)

(72) Inventor: Blaise J. Ganzel, Ann Arbor, MI (US)

(73) Assignee: ZF Active Safety US Inc., Livonia, MI (US)

( * ) Notice: Subject to any disclaimer, the term of this patent is extended or adjusted under 35 U.S.C. 154(b) by 0 days.

(21) Appl. No.: 17/898,607

(22) Filed: Aug. 30, 2022

(65) Prior Publication Data

US 2024/0067151 A1   Feb. 29, 2024

(51) Int. Cl.
*B60T 13/74* (2006.01)
*B60T 8/48* (2006.01)
*B60T 13/68* (2006.01)

(52) U.S. Cl.
CPC .......... *B60T 13/745* (2013.01); *B60T 8/4863* (2013.01); *B60T 13/68* (2013.01)

(58) Field of Classification Search
CPC ....... B60T 13/745; B60T 8/4863; B60T 13/68
See application file for complete search history.

(56) References Cited

U.S. PATENT DOCUMENTS

| 9,446,753 B2 | 9/2016 | Feigel et al. |
| 10,933,853 B2 | 3/2021 | Leiber et al. |
| 2023/0012180 A1 | 1/2023 | Ahn et al. |

FOREIGN PATENT DOCUMENTS

| JP | 2019147485 A | * | 9/2019 |
| WO | 2021/005154 A1 | | 1/2021 |

* cited by examiner

*Primary Examiner* — Michael Leslie
*Assistant Examiner* — Daniel S Collins
(74) *Attorney, Agent, or Firm* — Robert James Harwood

(57) ABSTRACT

A brake system includes a single chamber power transmission unit, a plurality of wheel brakes, and an iso/dump control valve arrangement associated with each wheel brake of the plurality of wheel brakes. A reservoir is hydraulically connected to the single chamber power transmission unit and to each of the iso/dump control valve arrangements. A pump piston is associated with at least one wheel brake. The pump piston is driven by a second electric motor for selectively providing pressurized hydraulic fluid from the reservoir to the iso/dump control valve arrangement of the at least one associated wheel brake. First and second switching valves are provided, and are two-position, three-way type valves, each hydraulically interposed between at least one iso/dump control valve arrangement and both of a selected pump piston and the output line of the single chamber power transmission unit. First and second electronic control units are provided.

23 Claims, 2 Drawing Sheets

SINGLE CHAMBER POWER TRANSMISSION UNIT AND BRAKE SYSTEMS USING SAME

TECHNICAL FIELD

This disclosure relates to an apparatus and method for use of a single chamber power transmission unit and, more particularly, to methods and apparatus of a single chamber power transmission unit and brake systems using same.

BACKGROUND

A brake system may include anti-lock control including a pedal-operated hydraulic braking pressure generator, a braking pressure modulator which is provided in the pressure fluid conduits between the braking pressure generator and the wheel brakes and which serves to vary the braking pressure by changing the volume of a chamber containing the hydraulic fluid, sensors for determining the wheel rotational behavior, and electronic circuits for processing the sensor signals and for generating braking-pressure control signals. Brake systems may also include both anti-lock control and traction slip control, which can use braking pressure modulators for controlled vehicular braking.

Descriptions of prior art brake systems are in U.S. Pat. No. 10,730,501, issued 4 Aug. 2020 to Blaise Ganzel and titled "Vehicle Brake System with Auxiliary Pressure Source", and in U.S. Patent Application Publication No. 2020/0307538, published 1 Oct. 2020 by Blaise Ganzel and titled "Brake System with Multiple Pressure Sources", both of which are incorporated herein by reference in their entirety for all purposes.

It may be desirable for a brake system to include various features to facilitate continued operation of at least one of the wheel brakes even after a partial or complete failure of another portion of the brake system.

SUMMARY

In an aspect, a single chamber power transmission unit is disclosed. The single chamber power transmission unit includes a ball screw and a ball nut selectively driven by the ball screw for longitudinal motion relative thereto. A piston is operatively coupled to the ball nut. A block housing at least partially encloses the piston and the ball screw. A chamber is at least partially defined by the block housing and a face of the piston. The chamber is configured to contain hydraulic fluid and is selectively pressurized by reciprocal motion of the piston with respect to the block housing driven directly by longitudinal motion of the ball nut. An inner wall of the chamber includes a replenishment groove extending longitudinally therealong. An output channel selectively places the chamber in fluid communication with at least one component of a brake system for provision of pressurized hydraulic fluid thereto. The output channel is in fluid communication with the replenishment groove. An electric motor selectively drives the ball screw to responsively reciprocate the piston within the chamber. A motor housing at least partially encloses the ball nut and the electric motor.

In an aspect, a brake system is disclosed. The brake system includes a single chamber power transmission unit, a plurality of wheel brakes, and an iso/dump control valve arrangement associated with each wheel brake of the plurality of wheel brakes. A reservoir is hydraulically connected to the single chamber power transmission unit and to each of the iso/dump control valve arrangements. A pump piston is associated with at least one wheel brake of the plurality of wheel brakes. The pump piston is driven by a second electric motor for selectively providing pressurized hydraulic fluid from the reservoir to the iso/dump control valve arrangement of the at least one associated wheel brake. First and second switching valves are provided, and are two-position, three-way type valves. The first and second switching valves are each hydraulically interposed between at least one iso/dump control valve arrangement and both of a selected pump piston and the output line of the single chamber power transmission unit. The first switching valve is in fluid communication with an associated iso/dump control valve arrangement via a first-side line and the second switching valve is in fluid communication with an associated iso/dump control valve arrangement via a second-side line. A first electronic control unit is operative to control the electric motor of the single chamber power transmission unit and at least one of the first and second switching valves. A second electronic control unit is operative to control the second electric motor and at least one of the iso/dump control valve arrangements.

BRIEF DESCRIPTION OF THE DRAWINGS

For a better understanding, reference may be made to the accompanying drawings, in which.

DESCRIPTION OF ASPECTS OF THE DISCLOSURE

Unless defined otherwise, all technical and scientific terms used herein have the same meaning as is commonly understood by one of ordinary skill in the art to which the present disclosure pertains.

The invention comprises, consists of, or consists essentially of the following features, in any combination.

Figure 1:
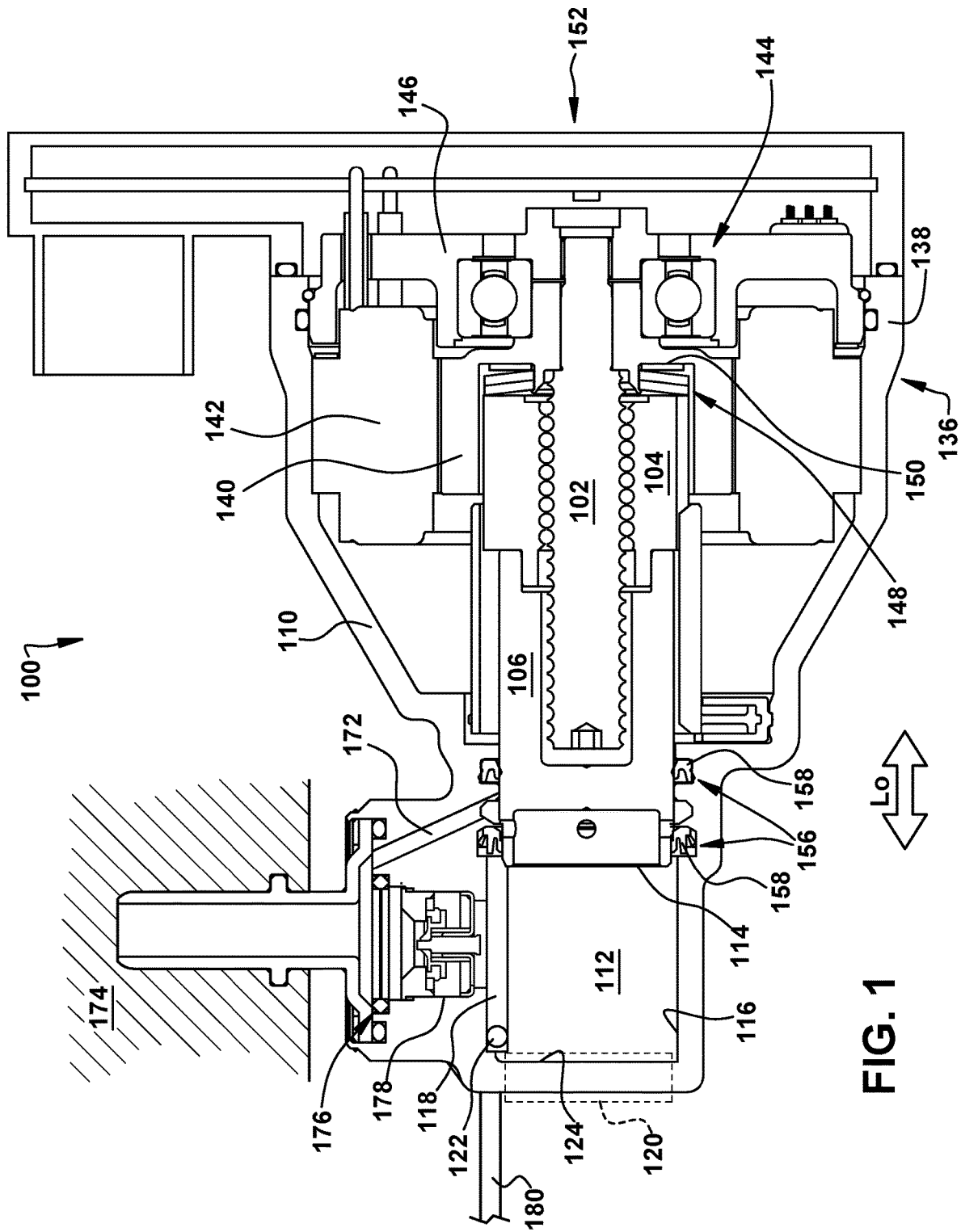
FIG. 1 is a schematic partial cross-sectional view of a single chamber power transmission unit according to an aspect of the present invention.

FIG. 1 depicts a power transmission unit of a single-chamber type, hereafter referenced for brevity as a single chamber power transmission unit or PTU 100. The PTU 100 includes a ball screw 102, a ball nut 104 selectively driven by the ball screw 102 for longitudinal motion relative thereto, and a piston 106 operatively coupled to the ball nut 104 (e.g., via a press-fit connection therebetween). The piston 106 is indirectly driven by the ball screw 102 via engagement of the piston 106 with the ball nut.

A block housing 110 at least partially encloses the piston 106 and the ball screw 102. A chamber 112 is at least partially defined by the block housing 110 and a face 114 of the piston 106. The chamber 112 is configured to contain hydraulic fluid and is selectively pressurized by reciprocal motion of the piston 106 with respect to the block housing 110. The piston 106 is driven directly by longitudinal motion of the ball nut 104. The term "longitudinal", as used herein, is substantially in the horizontal direction, in the orientation of FIG. 1, and is indicated by arrow "Lo".

An inner wall 116 of the chamber 112 includes a replenishment groove 118 extending longitudinally therealong. The replenishment groove 118 is shown in side cross-section in FIG. 1. As the piston 106 moves longitudinally with respect to the chamber 112, hydraulic fluid is permitted to travel through the replenishment groove 118 past the face 114 and outer surface of the piston 106.

The chamber 112 is shown in solid line in FIG. 1 as being formed as a single cavity, molded integrally into the block housing 110. It is contemplated, though, that the chamber 112 may be at least partially defined by an end cap (shown schematically in dashed line in FIG. 1 at 120) which is used to seal an open end of the chamber 112, when present. For example, use of an open-ended block housing 110, with an end cap 120 installed after assembly of the PTU 100, machining and assembly of the PTU 100 could be facilitated as desired. An example of a suitable end cap 120 is disclosed in co-pending U.S. patent application Ser. No. 17/708,070, filed 30 Mar. 2022 and titled "Tandem Power Transmission Unit and Brake Systems Using Same" (hereafter referenced as "the '070 application", the contents of which are incorporated herein by reference for all purposes).

An output channel 122 selectively places the chamber 112 in fluid communication with at least one component of a brake system for provision of pressurized hydraulic fluid thereto. An example brake system using the PTU 100 will be discussed in detail below, with reference to FIG. 2. The output channel 122 is in fluid communication with the replenishment groove 118. The output channel 122 may be located adjacent an end face 124 of the chamber 112 which is longitudinally spaced from, and may be longitudinally opposed to, the ball screw 102.

An electric motor 136 is provided for selectively driving the ball screw 102 to responsively reciprocate the piston 106 within the chamber 112. A motor housing 138, which may be integrally formed with the block housing 110, or separately provided and attached thereto, at least partially encloses the ball nut 104 and the electric motor 136. The electric motor 136 includes a motor rotor 140 operatively coupled to the ball screw 102 and a motor stator 142 mounted on the motor housing 138. Torque developed by the motor stator 142 is resisted by at least a portion of the motor housing 138 to mechanically stabilize the electric motor 136. When an end cap 120 is present, it may be located on the block housing 110 longitudinally opposite the electric motor 136.

A bearing 144, which may be, for example, a four-point contact bearing, rotatably supports a supported end of the ball screw 102 at a location spaced apart from the chamber 112. The motor rotor 140 is interposed longitudinally between the ball nut 104 and the bearing 144. The motor housing 138 includes a bearing retainer 146 to maintain the bearing 144 in position, in relation to the motor housing 138. This arrangement is shown schematically in FIG. 1. With reference to FIG. 1, at least one disc spring 148 (A.K.A. "Belleville washer", two shown) may be longitudinally interposed between the ball nut 104 and the bearing 144. As schematically depicted in FIG. 1, the disc springs 148 may be separated from the bearing 144 by at least a portion of a cup-shaped motor rotor 140. Additionally as shown, a washer 150 may be included in the stack, for desired wear resistance and/or rotatability reasons—in this instance, the washer 150 may be of a harder material than the material of the motor rotor 140. When present, the disc springs 148 may selectively compress under longitudinal force directed from the ball nut 104 toward the bearing 144, and may be helpful in cushioning a rotating stop of the ball nut 104 to avoid undesirable friction lock.

An electronic control unit housing 154 may be selectively connected to a portion of the block housing 110 spaced longitudinally apart from the chamber 112. The electronic control unit housing 154 encloses an electronic control unit 154 therein for operative connection to the electric motor 136. When a bearing retainer 146 is provided, such as in the arrangement shown in FIGS. 1-2, the bearing retainer 146 may be interposed longitudinally between the electronic control unit 154 and the electric motor 136 for preventing fluid communication therebetween, and may be provided with any desired o-rings or other seals to facilitate such sealing.

With reference to FIG. 1, the chamber 112 may include at least one annular sealing groove 156 configured to contain an annular seal 158, of any desired type, for resisting egress of hydraulic fluid from the chamber 112 in an undesirable direction. For example, an L-seal could be provided to a rightmost (in the orientation of FIG. 1) sealing groove 156 of the chamber 112, and a w-seal, or recup seal, could be provided to a more leftwardly oriented (in the orientation of FIG. 1) sealing groove 156 of the chamber 112, to provide desired sealing properties in a particular use environment. This is the arrangement shown, by way of example, in FIG. 1. Due at least in part to the presence of the replenishment groove 118 in the PTU 100, at least one of the annular seals 158 may be maintained within the annular sealing groove 156 and permit a predetermined amount of fluid flow therepast from at least one of the replenishment groove 118 and the chamber 112. The PTU 100 as shown and described herein includes two parallel replenishment flow paths—past at least one of the annular seals 158, as just mentioned, and through a replenishing check valve 176, as noted below. The replenishment groove 118 helps to prevent the piston 106 from restricting fluid flow, in both of these paths, depending upon the position of the piston 106 within the chamber 112.

The piston 106 may include a concave cup portion 160 having an interior surface at least partially defined by the face 114 of the piston 106. The cup portion 160 at least partially defines the chamber 112. A plurality of apertures 162 may be provided to the cup portion 160 to facilitate transfer of hydraulic fluid between the chamber 112 and a reservoir.

A reservoir channel 172 may be provided to the block housing 110 to place a portion of the chamber 110 located longitudinally between the two seals 158 (i.e., an annular region concentrically surrounding the piston 106) into fluid communication with a reservoir (shown schematically at 174) of a brake system, as will be described below. The reservoir may be attached directly to the block housing 110, using any suitable coupling feature. One of ordinary skill in the art will be able to readily provide a suitable arrangement for achieving desired couplings and fluid channels for a particular use environment of the PTU 100.

The reservoir channel 172 includes a replenishing check valve (176 interposed hydraulically between the reservoir 174 and the chamber 112. Details of a suitable replenishing check valve 176 are disclosed in the '070 application and incorporated herein by reference. The replenishing check valve 176 is maintained within a corresponding check valve cavity 178 of the block housing 110. The check valve cavity 178 is in fluid communication with the chamber 112, as shown in FIG. 1.

The reservoir channel 172, as shown in FIG. 1, facilitates return of fluid from the chamber 112 to the reservoir 174, and fluid is allowed to travel through a valve seat of the replenishing check valve 176 into the chamber 112, under a negative pressure influence from the chamber 112. More broadly, the replenishing check valve 176 is operable to selectively route hydraulic fluid from the reservoir 174 to the chamber 112, to replenish the chamber 112 as desired. For many use environments, this selective routing will be done when the electric motor 136 is rotating the ball screw 102.

Excess hydraulic fluid in the chamber 112 can be routed (optionally, through the replenishment groove 118 and/or past one or more of the annular seals 158) back to the reservoir 174, such as via reservoir channel 172, as desired. (It is contemplated that return flow may be also or instead routed into the face 114 of the piston 106 and then through one or more holes in the "skirt" of the piston 106 when the piston is fully retracted—in this manner, fluid can get past one or more of the annular seals 158 which does not permit return flow.) One of ordinary skill in the art will be readily able to configure a suitable replenishing check valve 176, reservoir channel 172, and other hydraulic supply/return arrangement for a particular use environment of the PTU 100.

For connection of the PTU 100 to a brake system 182, as will be described below with reference to FIG. 2, an output line 180 is in fluid connection with the chamber 112, such as via the output channel 122. The output line 180 is shown schematically in FIG. 1, and may be provided to a particular brake system 182 by one of ordinary skill in the art.

Figure 2:
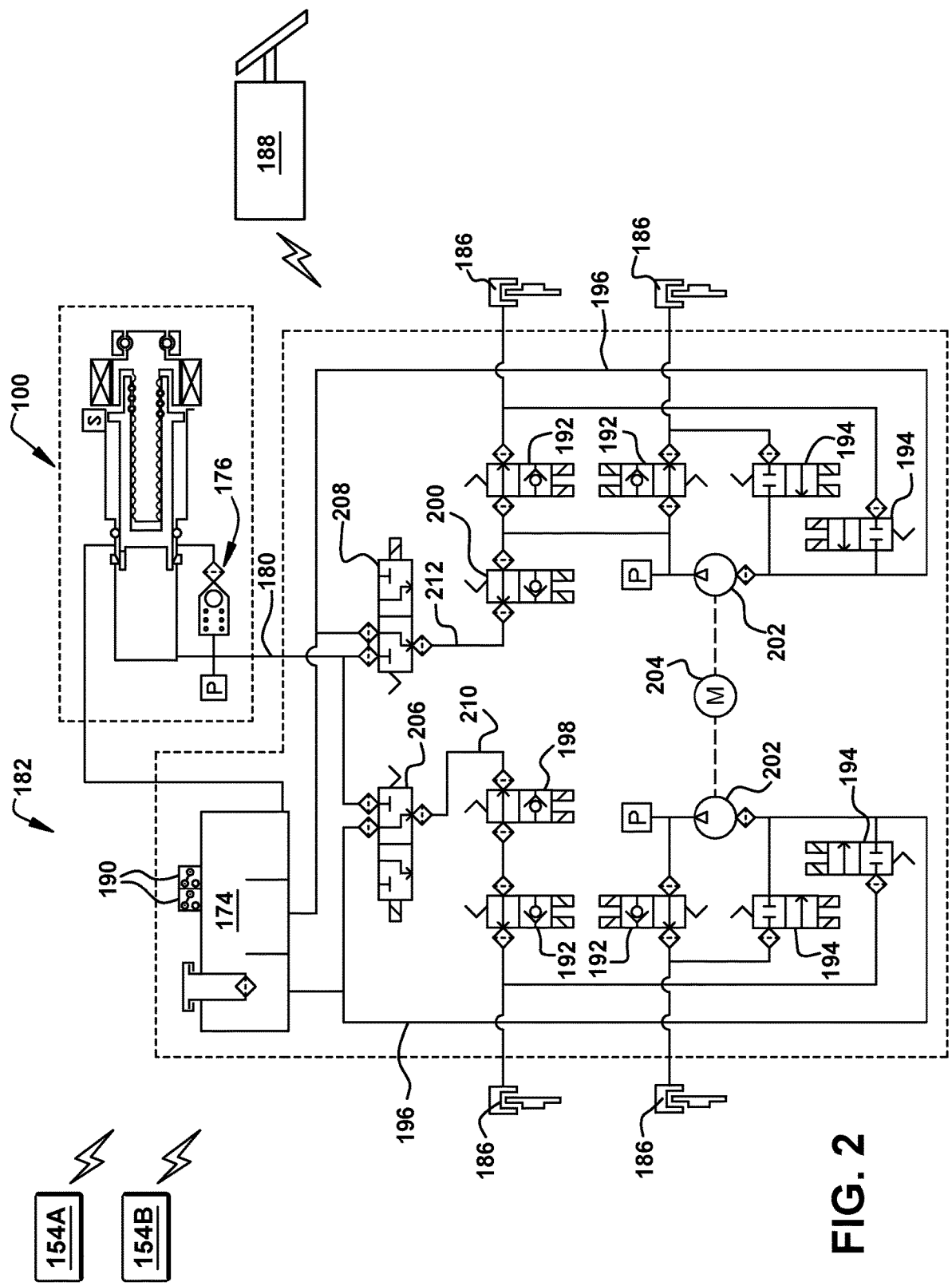
FIG. 2 is a schematic hydraulic diagram of an example brake system including the power transmission unit of FIG. 1.

FIG. 2 schematically depicts an example brake system 182 for actuating a plurality of wheel brakes 186. The brake system 182 is shown here as a hydraulic braking system, in which fluid pressure is utilized to apply braking forces for the brake system 182. The brake system 182 may suitably be used on a ground vehicle, such as an automotive vehicle having four wheels with a wheel brake associated with each wheel. Furthermore, the brake system 182 can be provided with other braking functions such as anti-lock braking (ABS) and other slip control features to effectively brake the vehicle. Components of the brake system 182 may be housed in one or more blocks or housings. The blocks or housings may be made from solid material, such as aluminum, that has been drilled, machined, or otherwise formed to house the various components. Fluid conduits may also be formed in the block or housing.

In the illustrated embodiments of the brake system 182 of FIGS. 2, there are four wheel brakes 186, which each can have any suitable wheel brake structure operated electrically and/or by the application of pressurized brake fluid. Each of the wheel brakes 186 may include, for example, a brake caliper mounted on the vehicle to engage a frictional element (such as a brake disc) that rotates with a vehicle wheel to effect braking of the associated vehicle wheel. The wheel brakes 186 can be associated with any combination of front and rear wheels of the vehicle in which the corresponding brake system 182 is installed. For example, the brake system 182 may be configured as a vertically split or diagonally split system. No differentiation is made herein among the wheel brakes 186, for the purposes of this description, though one of ordinary skill in the art could readily provide a suitable braking arrangement for a particular use environment.

Also for the sake of description, it is presumed that a deceleration signal transmitter (shown schematically at 188) is configured to provide a braking signal, in a wired or wireless manner, corresponding to a desired braking action by an operator of the vehicle. The deceleration signal transmitter 188 could include, but not be limited to, a brake pedal, an autonomous braking controller, and/or any other suitable scheme for generating a braking signal from which the brake system 182 can be actuated.

The brake system 182 also includes a fluid reservoir 174, as previously alluded to. The reservoir 174 stores and holds hydraulic fluid for the brake system 182. The fluid within the reservoir 174 is preferably held at or about atmospheric pressure, but the fluid may be stored at other pressures if desired. The reservoir 174 is shown schematically having three tanks or sections with fluid conduit lines connected thereto. The sections can be separated by several interior walls within the reservoir 174 and are provided to prevent complete drainage of the reservoir 174 in case one of the sections is depleted due to a leakage via one of the three lines connected to the reservoir 174. Alternatively, the reservoir 174 may include multiple separate housings. The reservoir 174 may include at least one fluid level sensor 190 (two shown in FIG. 2, for redundancy) for detecting the fluid level of one or more of the sections of the reservoir 174.

The PTU 100 of the brake system 182 functions as a source of pressure to provide a desired pressure level to the hydraulically operated wheel brakes 186 during a typical or normal non-failure brake apply. After a brake apply, fluid from the wheel brakes 186 may be returned to the PTU 100 and/or be diverted to the reservoir 174. It is also contemplated that other configurations (not shown) of the brake system 182 could include hydraulic control of just selected one(s) of the wheel brakes (with the others being electrically controlled/actuated). One of ordinary skill in the art would be readily able to provide such an arrangement for a desired use environment, following aspects of the present invention.

An iso/dump control valve arrangement is associated with each wheel brake 186 of the plurality of wheel brakes 186. Each iso/dump control valve arrangement includes an iso valve 192 and a dump valve 194, for providing desired fluid routing to an associated wheel brake 186. The reservoir 174 is hydraulically connected to the single-chamber PTU 100 and to each of the iso/dump control valve arrangements, such as via the return lines 196. The iso/dump control valve arrangements each include respective serially arranged iso and dump valves 192 and 194. The normally open iso valve 192 for each iso/dump control valve arrangement is located hydraulically between a respective wheel brake 186 and the PTU 100, and the normally closed dump valve 194 for each iso/dump control valve arrangement is located hydraulically between a respective wheel brake 186 and the reservoir 174, for the corresponding wheel brake 186.

The iso/dump control valve arrangements may selectively provide slip control to at least one wheel brake 186 powered by the PTU 100 and/or the pump/motor unit described below. More broadly, the iso/dump control valve arrangement, and/or other valves of the brake system 100, any of which may be solenoid-operated and have any suitable configurations, can be used to help provide controlled braking operations, such as, but not limited to, ABS, traction control, vehicle stability control, dynamic rear proportioning, regenerative braking blending, and autonomous braking.

First and second traction control iso valves 198 and 200 are each hydraulically interposed between the PTU 100 and at least one iso/dump control valve arrangement via the output channel 122 (here, via output line 180). The first and second traction control iso valves 198 and 200 are operative to assist with routing hydraulic fluid to the iso/dump control valve arrangements as desired.

A pump piston 202 is associated with at least one wheel brake 186 of the plurality of wheel brakes 186. The pump piston 202 is driven by a second electric motor 204 (as differentiated from the electric motor 136 included in the PTU 100) for selectively providing pressurized hydraulic fluid to the iso/dump control valve arrangement of at least one wheel brake 186 which is associated with the pump piston 202. In FIG. 2, one pump piston 202 is associated with two wheel brakes 186, for a total of two pump pistons 202 in the brake system 182. Together, the pump piston(s)

202 and second electric motor 204 can be considered to comprise a secondary brake module of the brake system 182.

The secondary brake module of the brake system 182 functions as a source of pressure to provide a desired pressure level to selected ones of the wheel brakes 186 in a backup or "failed" situation, when, for some reason, the PTU 100 is unable to provide fluid to those selected wheel brakes 186. The secondary brake module can be used to selectively provide hydraulic fluid to at least one of the wheel brakes 186 in a backup braking mode, but also in an enhanced braking mode, which can occur on its own and/or concurrently with either the backup braking mode or a non-failure normal braking mode. Examples of suitable enhanced braking mode functions available to the brake system 182 include, but are not limited to, "overboost" (in which higher pressure is provided to a particular brake than would normally be available from the PTU 100 alone) and "volume-add" (in which more fluid is provided to a particular brake than would normally be available from the PTU 100). One of ordinary skill in the art will be readily able to configure a brake system 182 for any particular use application as desired.

To facilitate switching of a source of hydraulic fluid to each of the wheel brakes 186, first and second switching valves 206 and 208, respectively, are provided to the brake system 182 shown in FIG. 2. The first and second switching valves 206 and 208 are each two-position, three-way type valves. The first and second switching valves 206 and 208 are each hydraulically interposed between at least one selected iso/dump control valve arrangement and both of a selected pump piston 202 and the output line 180 of the single chamber PTU 100. In this manner, the first and second switching valves 206 and 208 can each control, for the corresponding iso/dump control valve arrangement(s), whether hydraulic fluid is provided to the corresponding wheel brake(s) from at least one of the pump piston 202 and the output line 180 of the PTU 100. (E.g., in some use environments, when the first and second switching valves 206 and 108 are de-energized, only the pump piston(s) 202 can apply the brakes; when the first and second switching valves 206 and 208 are energized, then both the pump piston(s) 202 and the PTU 100, via output line 180, can apply the brakes.) Accordingly, the first and second switching valves 206 and 208 facilitate the aforementioned normal non-failure and backup braking mode operation of the brake system 182.

Regardless of the source of the hydraulic fluid, though, the first switching valve 206 is in fluid communication with at least one associated iso/dump control valve arrangement via a first-side line 210, and the second switching valve 208 is in fluid communication with at least one associated iso/dump control valve arrangement via a second-side line 212. It should be noted that the previously described first and second traction control iso valves 198 and 200 are hydraulically interposed between respective first and second switching valves 206 and 208 and at least one corresponding iso/dump control valve arrangement via the first-side and second-side lines 210 and 212, respectively, as shown in FIG. 2.

The brake system 182 also includes at least one electronic control unit ("ECU") 154, with first and second ECUs 154A, 154B being shown and described herein. The ECUs 154A, 154B may include microprocessors and other electrical circuitry. The ECUs 154A, 154B receive various signals, process signals, and control the operation of various electrical components of a corresponding brake system 182 in response to the received signals, in a wired and/or wireless manner. The ECUs 154A, 154B can be connected to various sensors such as the reservoir fluid level sensor(s) 190, pressure sensors, travel sensors, switches, wheel speed sensors, and steering angle sensors. The ECUs 154A, 154B may also be connected to an external module (not shown) for receiving information related to yaw rate, lateral acceleration, longitudinal acceleration of the vehicle, or other characteristics of vehicle operation for any reason, such as, but not limited to, controlling the brake system 100 during vehicle braking, stability operation, or other modes of operation. Additionally, the ECUs 154A, 154B may be connected to the instrument cluster for collecting and supplying information related to warning indicators such as an ABS warning light, a brake fluid level warning light, and a traction control/vehicle stability control indicator light. It is contemplated that at least one of the ECUs 154A and 154B may be, for example, integrated into the PTU 100, such as that shown and described with reference to FIG. 1.

The first ECU 154A is operative to control the electric motor 136 of the PTU 100, as shown in FIG. 2, and at least one of the first and second switching valves 206 and 208. The second ECU 154B is operative to control the second electric motor 204, at least one of the iso/dump control valve arrangements, and at least one of the first and second traction control iso valves 198, 200.

An example of a suitable ECU 154 arrangement is disclosed in co-pending U.S. patent application Ser. No. 17/708,019, filed concurrently herewith and titled "Control Arrangement for a Brake System", hereafter referenced as "the backed-up ECU"), which is incorporated by reference herein in its entirety for all purposes.

In the brake system 182 shown and described herein, the pump pistons 202 are able to pull hydraulic fluid directly from the reservoir 174. During certain phases of operation, the pump pistons 202 may provide pressurized fluid to the PTU 100 via the output line 180, in a manner that tends to "backdrive" the PTU 100. Because there is no brake pedal attached to the PTU 100 this "backdrive" feature may be desirable in some circumstances to facilitate brake venting, to avoid working the electric motor 136 and the second electric motor 204 against each other, or for any other desired reason.

In the brake system 182 shown in FIG. 2, each pump piston 202 is able to route fluid directly to and from the reservoir 174 via the pair of return lines 196, as desired. As a result, even if one of the ECUs 154A, 154B is not available to the brake system 182 for some reason, fluid levels in the reservoir 174 can be monitored and adjusted via control of either the electric motor 136 or the second electric motor 204, depending upon which of the ECUs 154A, 154B is still available within the brake system 182 at that time.

Stated differently, and as shown in FIG. 2, each pump piston 202 has two associated wheel brakes 186, and provides pressurized hydraulic fluid to the iso/dump control valve arrangement of both of the associated wheel brakes 186 on that same side of the brake system 182; there are a total of two pump pistons 202 in the brake system 182 as shown. In the brake system 182, boosted braking can be provided using the second electric motor 204 acting through the two pump pistons 202, since the pump pistons 202 can pull fluid directly from the reservoir and are not wholly reliant on fluid coming from the PTU 100 for operation.

All of the iso valves 192, dump valves 194, and the first and second traction control iso valves 198 and 200 are shown as being dual wound in the brake system 182 of FIG. 2 (though single-wound valves are contemplated for use, also or instead, in other implementations of the brake system 182, and may include dual/redundant electronic control circuits, as desired). As a result, both of the ECUs 154A, 154B are capable of controlling any one or more of these dual wound valves, under first (normal) and/or second (backup) braking modes. It is also contemplated that the first and second traction control iso valves 198 and 200 could be actuated to allow the PTU 100 to replenish the wheel brakes during backup mode slip control.

In summary, in the brake system 182 shown in FIG. 2, at least the first ECU 154A is operative to control the electric motor 136 of the PTU 100, the iso/dump control valve arrangements (comprising iso valves 192 and dump valves 194), the first and second switching valves 206 and 208, and at least one of the first and second traction control iso valves 198 and 200 under the first braking mode. Analogously, at least the second ECU 154B is operative to control the second electric motor 204 associated in this brake system 182D with the pump pistons 202, the iso/dump control valve arrangements (comprising iso valves 192 and dump valves 194), and at least one of the traction control iso valves 198 and 200 under the second braking mode.

As signified by the dashed lines in FIG. 2, it is contemplated that the PTU 100 could be located remotely from one or more other components of the brake system 182, which may be desirable for space, manufacturing, and/or any other reason for a particular use environment of the brake system 182. Conversely, the PTU 100 could be co-located with other components of the brake system 182; one of ordinary skill in the art can readily provide a suitably configured brake system 182 as desired.

It is contemplated that various other components, such as electric service and/or parking brake motors, could be provided by one of ordinary skill in the art to achieve desired configurations for particular use environments, in any of the brake systems 178 described herein. For example, while a number of filters and pressure sensors are shown in the Figures, specific description thereof has been omitted herefrom for brevity, as one of ordinary skill in the art will readily understand how to provide a desired number, placement, and/or operation of filters, sensors, and any other components as desired for a particular use environment of the present invention.

As used herein, the singular forms "a", "an", and "the" can include the plural forms as well, unless the context clearly indicates otherwise. It will be further understood that the terms "comprises" and/or "comprising", as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

It will be understood that when an element is referred to as being "on", "attached" to, "connected" to, "coupled" with, "contacting", "adjacent", etc., another element, it can be directly on, attached to, connected to, coupled with, contacting, or adjacent the other element, or intervening elements may also be present. In contrast, when an element is referred to as being, for example, "directly on", "directly attached" to, "directly connected" to, "directly coupled" with, "directly contacting", or "directly adjacent" another element, there are no intervening elements present. It will also be appreciated by those of ordinary skill in the art that references to a structure or feature that is disposed "directly adjacent" another feature may have portions that overlap or underlie the adjacent feature, whereas a structure or feature that is disposed "adjacent" another feature might not have portions that overlap or underlie the adjacent feature.

Spatially relative terms, such as "under", "below", "lower", "over", "upper", "proximal", "distal", and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that, although the terms "first", "second", etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking potentially aiding a user in selecting one component from an array of similar components for a particular use environment. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

I claim:

1. A single chamber power transmission unit, comprising:
   a ball screw;
   a ball nut selectively driven by the ball screw for longitudinal motion relative thereto;
   a piston operatively coupled to the ball nut;
   a block housing at least partially enclosing the piston and the ball screw;
   a chamber at least partially defined by the block housing and a face of the piston, the chamber being configured to contain hydraulic fluid and selectively pressurized by reciprocal motion of the piston with respect to the block housing driven directly by longitudinal motion of the ball nut, an inner wall of the chamber including a replenishment groove extending the length of the chamber;
   an output channel selectively placing the chamber in fluid communication with at least one component of a brake system for provision of pressurized hydraulic fluid thereto, the output channel being in fluid communication with the replenishment groove;
   an electric motor for selectively driving the ball screw to responsively reciprocate the piston within the chamber; and
   a motor housing at least partially enclosing the ball nut and the electric motor.

2. The single chamber power transmission unit of claim 1, wherein the output channel is located adjacent an end face of the chamber which is longitudinally spaced from the ball screw.

3. The single chamber power transmission unit of claim 1, including a bearing for rotatably supporting a supported end of the ball screw spaced apart from the chamber, wherein the motor housing includes a bearing retainer to maintain the bearing in relation to the motor housing.

4. The single chamber power transmission unit of claim 3, including at least one disc spring longitudinally interposed between the ball nut and the bearing, the at least one disc spring selectively compressing under longitudinal force directed from the ball nut toward the bearing.

5. The single chamber power transmission unit of claim 1, wherein the chamber is at least partially defined by an end cap located on the block housing longitudinally opposite the electric motor.

6. The single chamber power transmission unit of claim 1, wherein the electric motor includes a motor rotor operatively coupled to the ball screw and a motor stator mounted on the motor housing wherein torque developed by the motor stator is resisted by at least a portion of the motor housing.

7. The single chamber power transmission unit of claim 6, including a bearing for rotatably supporting a supported end of the ball screw spaced apart from the chamber, wherein the motor rotor includes a portion that is interposed longitudinally between the ball nut and the bearing.

8. The single chamber power transmission unit of claim 1, including an electronic control unit housing selectively connected to a portion of the block housing spaced longitudinally apart from the chamber, the electronic control unit housing enclosing an electronic control unit therein for operative connection to the electric motor.

9. The single chamber power transmission unit of claim 8, including a bearing for rotatably supporting a supported end of the ball screw spaced apart from the chamber, wherein the motor housing includes a bearing retainer to maintain the bearing in relation to the motor housing, and wherein the bearing retainer is interposed longitudinally between the electronic control unit and the electric motor for preventing fluid communication therebetween.

10. The single chamber power transmission unit of claim 1, wherein the chamber includes at least one annular sealing groove configured to selectively contain an annular seal for resisting egress of hydraulic fluid from the chamber.

11. The single chamber power transmission unit of claim 10, wherein the annular seal is maintained within the annular sealing groove and permits fluid flow therepast from at least one of the replenishment groove and the chamber.

12. The single chamber power transmission unit of claim 1, including a reservoir supply channel placing a reservoir in supplying fluid connection with the chamber.

13. The single chamber power transmission unit of claim 12, wherein the reservoir supply channel includes a replenishing check valve interposed hydraulically between the reservoir and the chamber.

14. The single chamber power transmission unit of claim 13, wherein the replenishing check valve is maintained within a check valve cavity of the block housing which is in fluid communication with the chamber.

15. The single chamber power transmission unit of claim 12, wherein the replenishing check valve is operable to selectively route hydraulic fluid from the reservoir to the chamber when the electric motor is rotating the ball screw.

16. A brake system, comprising:
   the single chamber power transmission unit of claim 1;
   a plurality of wheel brakes;
   an iso/dump control valve arrangement associated with each wheel brake of the plurality of wheel brakes;
   a reservoir hydraulically connected to the single chamber power transmission unit and to each of the iso/dump control valve arrangements;
   a pump piston associated with at least one wheel brake of the plurality of wheel brakes, the pump piston being driven by a second electric motor for selectively providing pressurized hydraulic fluid from the reservoir to the iso/dump control valve arrangement of the at least one associated wheel brake;
   first and second switching valves, being two-position, three-way type valves, the first and second switching valves each being hydraulically interposed between at least one iso/dump control valve arrangement and both of a selected pump piston and the output line of the single chamber power transmission unit;

a first electronic control unit operative to control the electric motor of the single chamber power transmission unit and at least one of the first and second switching valves; and a second electronic control unit operative to control the second electric motor and at least one of the iso/dump control valve arrangements.

17. A brake system, comprising:

a single chamber power transmission unit;

a plurality of wheel brakes;

an iso/dump control valve arrangement associated with each wheel brake of the plurality of wheel brakes;

a reservoir hydraulically connected to the single chamber power transmission unit and to each of the iso/dump control valve arrangements;

a pump piston associated with at least one wheel brake of the plurality of wheel brakes, the pump piston being driven by a second electric motor for selectively providing pressurized hydraulic fluid from the reservoir to the iso/dump control valve arrangement of the at least one associated wheel brake;

first and second switching valves, being two-position, three-way type valves, the first and second switching valves each being hydraulically interposed between at least one iso/dump control valve arrangement and both of a selected pump piston and the output line of the single chamber power transmission unit, the first switching valve being in fluid communication with an associated iso/dump control valve arrangement via a first-side line and the second switching valve being in fluid communication with an associated iso/dump control valve arrangement via a second-side line;

a first electronic control unit operative to control the electric motor of the single chamber power transmission unit and at least one of the first and second switching valves; and a second electronic control unit operative to control the second electric motor and at least one of the iso/dump control valve arrangements.

18. The brake system of claim 17, including:

a first traction control iso valve hydraulically interposed between the first switching valve and at least one iso/dump control valve arrangement via the first-side line; and a second traction control iso valve hydraulically interposed between the second switching valve and at least one iso/dump control valve arrangement via the second-side line.

19. The brake system of claim 18, wherein at least one of the first and second traction control iso valves is controlled by the second electronic control unit.

20. The single chamber power transmission unit of claim 1, wherein the piston reciprocates within the chamber along a centerline and the replenishment groove has a length extending parallel to the centerline.

21. The single chamber power transmission unit of claim 1, wherein the replenishment groove is configured to allow hydraulic fluid to flow between opposing sides of a face of the piston without exiting the block housing.

22. The single chamber power transmission unit of claim 1, wherein the output channel extends to the replenishment groove.

23. The single chamber power transmission unit of claim 1, wherein the replenishment groove extends over greater than half the length of the chamber.

* * * * *